US011828898B1

(12) United States Patent
Eizen et al.

(10) Patent No.: US 11,828,898 B1
(45) Date of Patent: Nov. 28, 2023

(54) DETECTING UNDERGROUND UTILITIES

(71) Applicant: Exodigo Ltd., Tel Aviv (IL)

(72) Inventors: Arad Eizen, Rishon LeZion (IL); Yaniv Fichman, Nof HaGalil (IL); Oriel Halvani, Kiryat Ono (IL)

(73) Assignee: Exodigo Ltd., Tel Aviv (IL)

( * ) Notice: Subject to any disclaimer, the term of this patent is extended or adjusted under 35 U.S.C. 154(b) by 0 days.

(21) Appl. No.: 18/141,421

(22) Filed: Apr. 30, 2023

(51) Int. Cl.
| | |
|---|---|
| *G01V 3/00* | (2006.01) |
| *G01V 3/12* | (2006.01) |
| *G01V 3/10* | (2006.01) |
| *G01V 3/08* | (2006.01) |
| *G01V 3/28* | (2006.01) |
| *G01S 13/88* | (2006.01) |
| *G01S 13/02* | (2006.01) |

(52) U.S. Cl.
CPC ............. *G01V 3/12* (2013.01); *G01V 3/083* (2013.01); *G01V 3/101* (2013.01); *G01V 3/28* (2013.01); *G01S 13/0209* (2013.01); *G01S 13/88* (2013.01); *G01S 13/885* (2013.01)

(58) Field of Classification Search
CPC .......... G01V 3/12; G01V 3/101; G01V 3/083; G01V 3/28; G01S 13/885; G01S 13/88; G01S 13/0209
USPC ................................ 324/323, 327, 332, 376
See application file for complete search history.

(56) References Cited

U.S. PATENT DOCUMENTS

| | | | |
|---|---|---|---|
| 7,994,770 | B2 | 8/2011 | Royle et al. |
| 8,013,610 | B1 | 9/2011 | Merewether et al. |
| 8,717,028 | B1 | 5/2014 | Merewether et al. |
| 9,880,309 | B2 | 1/2018 | Merewether et al. |
| 10,247,845 | B1 | 4/2019 | Merewether et al. |
| 10,534,105 | B2 | 1/2020 | Merewether et al. |
| 10,754,053 | B1 | 8/2020 | Olsson et al. |
| 2017/0153348 | A1* | 6/2017 | Manning ................... G01V 3/12 |
| 2018/0120467 | A1* | 5/2018 | Manning ................... G01V 3/12 |

* cited by examiner

Primary Examiner — Raul J Rios Russo

(57) ABSTRACT

A system for detecting underground utilities in a certain area, comprising one or more transmitters deployed to transmit electromagnetic signals in one or more frequency bands into the ground in a certain area, one or more electromagnetic sensors adapted to capture electromagnetic radiation emitted by one or more underground utilities in the certain area responsive to excitation by the electromagnetic signals transmitted by the transmitter(s), and one or more processors communicatively coupled to the electromagnetic sensor(s) and adapted to detect the underground utility(s) according to the electromagnetic radiation captured by the electromagnetic sensor(s). wherein the transmitter(s) are adapted to maintain a transmission power of the electromagnetic signals above a certain power threshold by adjusting an amplitude and/or a frequency of each electromagnetic signal to induce a current exceeding a certain current threshold through an antenna feed circuit to compensate for external impedance affecting the one or more transmitters.

20 Claims, 4 Drawing Sheets

– 1 –

DETECTING UNDERGROUND UTILITIES

FIELD AND BACKGROUND OF THE INVENTION

The present invention relates, in some embodiments thereof, to detecting underground utilities buried in the ground and, more specifically, but not exclusively, to detecting underground utilities buried in the ground using wideband electromagnetic sensors and frequency self-adjusting transmitters.

Detecting underground utilities, for example, electric cables, telecommunication and data cables, water and sewer pipelines, gas and oil pipelines, and/or the like is a critical process in many industries, including construction, telecommunications, and energy. Accidental damage to underground utilities may cause serious safety hazards, significant financial losses, and disruptions to essential services.

However, the detection of underground utilities has historically been a challenging and time-consuming process. Conventional methods for detecting underground utilities include manual excavation, ground-penetrating radar, and electromagnetic induction. Such methods may have major inherent limitations, including the need for large equipment, limited depth penetration, and poor accuracy in certain soil conditions. In addition, conventional methods can be expensive, time-consuming, and disruptive to surrounding areas.

Recent developments in electromagnetic technology have led to the development of more advanced utility detection systems utilizing electromagnetic signals to detect the presence of wider range of underground utilities in a range of soil conditions with higher accuracy and reliability.

SUMMARY OF THE INVENTION

An objective of the embodiments of the disclosure is to provide a solution for detecting underground utilities which mitigates or solves the drawbacks and problems of conventional solutions. The above and further objectives are solved by the subject matter of the independent claims. Further advantageous embodiments can be found in the dependent claims.

According to a first aspect of the present invention there is provided a system for detecting underground utilities in a certain area, comprising:

One or more transmitters deployed to transmit electromagnetic signals in one or more frequency bands into the ground in a certain area. Each transmitter is adapted to maintain a transmission power of the electromagnetic signals above a certain power threshold by adjusting an amplitude and/or a frequency of each electromagnetic signal generated by a signal generator of the one or more transmitters to induce a current exceeding a certain current threshold through an antenna feed circuit electrically coupling the signal generator to an antenna of the transmitter to compensate for external impedance affecting the one or more transmitters.

One or more electromagnetic sensors adapted to capture electromagnetic radiation emitted, in the one or more frequency bands, by one or more underground utilities in the certain area responsive to excitation by the electromagnetic signals transmitted by the one or more transmitters.

One or more processors, communicatively coupled to the one or more electromagnetic sensors, adapted to detect the one or more underground utilities according to the electromagnetic radiation captured by the one or more electromagnetic sensors.

According to a second aspect of the present invention there is provided a method of detecting underground utilities in a certain area, comprising using one or more processors for:

Receiving data indicative of electromagnetic radiation captured in one or more frequency bands by one or more electromagnetic sensors deployed to capture electromagnetic radiation emitted by one or more underground utilities located in a certain area. The one or more underground utilities emit the electromagnetic radiation responsive to excitation by one or more electromagnetic signals transmitted in one or more frequency bands by one or more transmitters deployed to transmit electromagnetic signals into the ground in the certain area. Each transmitter is adapted to maintain a transmission power of the electromagnetic signals to exceed a certain power threshold by adjusting an amplitude and/or a frequency of each electromagnetic signal generated by a signal generator of the one or more transmitters in one or more frequency bands to induce a current exceeding a certain current threshold through an antenna feed circuit electrically coupling the signal generator to an antenna of the transmitter to compensate for external impedance affecting the one or more transmitters.

Detecting the one or more underground utilities according to the electromagnetic radiation captured by the one or more electromagnetic sensors;

In a further implementation form of the first, and/or second aspects, the one or more processors are further adapted to compute a location of the one or more underground utilities according to the electromagnetic radiation captured by the one or more electromagnetic sensors and one or more of: a location of the one or more electromagnetic sensors, and/or a location of the one or more transmitters.

In a further implementation form of the first, and/or second aspects, the location of one or more of the electromagnetic sensors and/or the location of one or more of the transmitters is extracted from geolocation data captured by one or more geolocation sensor mechanically coupled to the one or more electromagnetic sensor and to the one or more transmitter respectively.

In a further implementation form of the first, and/or second aspects, the location of one or more of the electromagnetic sensors and/or the location of one or more of the transmitters is predefined.

In a further implementation form of the first, and/or second aspects, one or more of the electromagnetic sensors are dynamically moveable over the certain area.

In a further implementation form of the first, and/or second aspects, one or more of the processors are locally deployed on-site at the certain area.

In a further implementation form of the first, and/or second aspects, one or more of the processors are deployed remotely and is communicatively coupled to the one or more electromagnetic sensors.

In an optional implementation form of the first, and/or second aspects, one or more of the transmitters are further configured to transmit an indication of the amplitude and/or frequency of the electromagnetic signals transmitted by the respective transmitter.

In an optional implementation form of the first, and/or second aspects, one or more of the electromagnetic sensors are further configured to capture electromagnetic radiation in a selected frequency range.

In an optional implementation form of the first, and/or second aspects, one or more of the electromagnetic sensors are further configured to output information relating to electromagnetic radiation captured in a selected frequency range.

In an optional implementation form of the first, and/or second aspects, one or more of the are further adapted to adjust the transmission power of its transmitted electromagnetic signals according to a distance between the one or more electromagnetic sensors and the respective transmitter.

In an optional implementation form of the first, and/or second aspects, one or more of the transmitters are further configured to adjust the frequency and/or amplitude of one or more electromagnetic signal transmitted by the respective transmitter according to the electromagnetic radiation captured by the one or more electromagnetic sensors.

In an optional implementation form of the first, and/or second aspects, one or more of the transmitters are further adapted to disable transmission of the electromagnetic signals according to an external command.

In an optional implementation form of the first, and/or second aspects, one or more of the transmitters are further adapted to set the one or more frequency band, optionally according to an external command.

In an optional implementation form of the first, and/or second aspects, one or more of the transmitters are further adapted to maintain the transmission power of the electromagnetic signals below a peak power threshold by adjusting the amplitude of one or more electromagnetic signals to induce a current not exceeding a peak current threshold through the antenna feed circuit.

In a further implementation form of the first, and/or second aspects, one or more of the transmitters are configured to set a base frequency of the one or more frequency band by adjusting one or more adjustable impedance elements electrically coupled to the antenna feed circuit.

In a further implementation form of the first, and/or second aspects, one or more of the adjustable impedance elements comprise a plurality of fixed capacitance capacitors each electrically coupled to the antenna feed circuit via a respective switch operable to connect and disconnect the respective fixed capacitance capacitor.

In a further implementation form of the first, and/or second aspects, one or more of the adjustable impedance elements comprise one or more variable capacitors.

In a further implementation form of the first, and/or second aspects, the signal generator is adapted to adjust the frequency of the transmitted electromagnetic signals within the one or more frequency bands using a clock generator.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks automatically. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of methods and/or systems as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars are shown by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
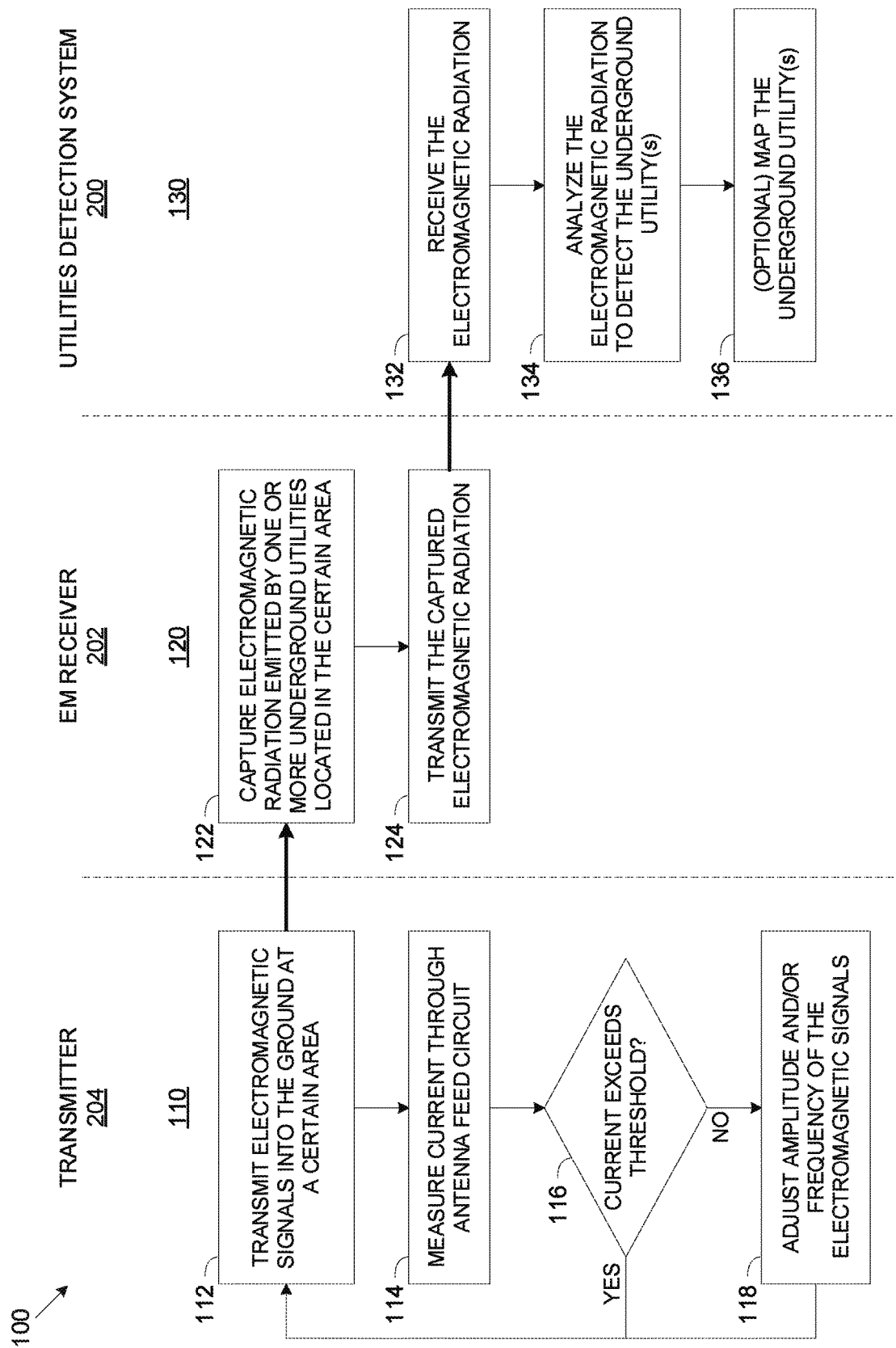
FIG. 1 is a flowchart of an exemplary process of detecting underground utilities buried in the ground, according to some embodiments of the present invention.

The present invention relates, in some embodiments thereof, to detecting underground utilities buried in the ground and, more specifically, but not exclusively, to detecting underground utilities buried in the ground using wideband electromagnetic sensors and frequency self-adjusting transmitters.

According to some embodiments of the present invention, there are provided methods, systems and computer program products for detecting underground utilities and/or objects buried in the ground in a certain area, for example, electric cables, telecommunication and data cables, water and sewer pipelines, gas and oil pipelines, and/or the like.

One or more transmitters may be deployed to transmit electromagnetic signals into the ground at the certain area in attempt to excite one or more buried underground utilities and induce an alternating current therein. In response to the electromagnetic signals transmitted by the transmitter(s), the excited underground utility(s) may emit electromagnetic radiation which may be captured by one or more electromagnetic sensors.

The captured electromagnetic radiation may be then analyzed to detect one or more underground utilities buried in the ground in the certain area and optionally map them, for example, compute their location (e.g., geolocation, position, orientation, depth, etc.), portray them in a map (map, chart, illustration, picture, etc.) of the area and/or the like.

The transmitter(s) may be adapted to maintain transmission power of their transmitted electromagnetic signals in order to compensate for external impedance effects and maintain the transmission power above a certain threshold in order to ensure that the electromagnetic radiation emitted by the excited underground utility(s) is sufficient for efficient detection by the electromagnetic sensor(s).

The external impedance affecting the impedance of the transmitter(s) may be induced by one or more external entities, elements, devices, and/or conditions. For example, since the transmitter(s) may be typically in close proximity to the ground, one or more attributes, characteristics and/or parameters of the ground may affect the transmitter(s)' impedance. For example, capacitive effect of earth ground, the ground may act as a conductive plane which may affect, for example lower the impedance of one or more of the transmitters, specifically the impedance of the antenna and/or of the antenna feed circuit. In another example, ground losses due to the fact that ground resistance may be typically higher at lower frequencies may affect the impedance of one or more of the transmitters, for example, decrease antenna gain. In another example, one or more underground utilities (radials) themselves which are buried in the ground may impact the capacitive effect of the ground and may thus affect the impedance characteristics of one or more transmitters.

The impact of external impedance may change the impedance of the transmitter which may be reflected by changes in a current driven by a signal generator of the transmitter through an antenna feed circuit to an antenna of the transmitter.

Each transmitter may be therefore adapted to adjust the amplitude and/or the frequency of the electromagnetic signals to induce a current in the antenna feed circuit which exceeds a certain current threshold which translates to maintaining the transmission power of the transmitted electromagnetic signals above a certain power threshold. To this end, each transmitter may be adapted to transmit electromagnetic signals in a plurality of frequencies in one or more frequency bands which may be selected and/or set using one or more adjustable impedance elements electrically coupled to the antenna feed circuit.

The transmitter may apply an iterative process in which it may sense the current in the antenna feed circuit and adjust the amplitude and/or the frequency of the electromagnetic signals until the current in the antenna feed circuit exceeds the current threshold.

Complementary, in order to effectively, robustly and/or reliably capture the emitted electromagnetic radiation, which may correspond to the frequency(s) of the exciting electromagnetic signals transmitted by the transmitter(s), each electromagnetic sensor may comprise a wideband receiver adapted to capture electromagnetic radiation in a wide frequency range corresponding to the wide frequency range of the transmitter which may span across the plurality of frequency bands.

Optionally, one or more of the electromagnetic sensor(s) may be adapted to scan and capture electromagnetic radiation in one or more frequency ranges rather than in the entire wide frequency range supported by the transmitter(s) and in which the electromagnetic signals may be therefore transmitted.

Optionally, one or more of the electromagnetic sensor(s) may be adapted to output and transmit only part of the captured electromagnetic radiation for analysis, by one or more devices, systems, and/or services, to detect buried underground utilities.

Advantages

First, maintaining the transmission power above the threshold in the presence of external impedance effects which may change between environments, areas, and/or conditions may ensure that the electromagnetic signals can effectively penetrate the ground and excite the underground utility(s) to emit electromagnetic radiation which may be then accurately, robustly and/or reliably picked up and captured by the electromagnetic sensor(s) regardless of whatever impedance effects may apply to the transmitter.

This is a major advantage over the existing methods which may typically comprise narrow band sensors limited to intercepting electromagnetic signals transmitted in a single frequency or at best in a single, typically narrow, frequency band. As such the transmitter may be unable to significantly adjust frequency of their transmitted electromagnetic signals which may prevent overcoming the external impedance affects which may significantly attenuate the electromagnetic signals. The attenuated electromagnetic signals may fail to effectively excite the underground utility(s) thus significantly reducing the emitted electromagnetic radiation which in turn may degrade performance of underground utilities detection, for example, efficiency, accuracy, reliability, robustness, and/or the like.

Moreover, some of the existing methods may apply frequency tuning and/or adjustment for the electromagnetic signals transmitted by the transmitter based on the output signal. To this end, such methods may apply an external feedback loop using an external spectrum scanner to identify strength of the transmitted electromagnetic signals and adjust them accordingly. Such an external feedback loop may significantly increase complexity of the deployed equipment since additional spectrum sensors are required that are in communication with the transmitter. This increased complexity may significantly increase design, deployment, and/or maintenance costs.

Marinating the transmission power above a sufficiently high power threshold based only on internal current at the antenna feed circuit may be obviously done without the need for external feedback thus significantly reducing complexity, cost, and/or the like while ensuring high power electromagnetic signals which may effectively penetrate the ground to excite the underground utility(s) which may emit electromagnetic radiation having sufficiently high power to be effectively captured by the electromagnetic sensor(s).

Furthermore, adapting the electromagnetic sensor(s) to scan a reduced frequency range may reduce scan time, and/or power consumption of the electromagnetic sensor(s). Scanning the reduced frequency range may also yield reduced electromagnetic radiation data transmitted from the electromagnetic sensor(s) for analysis to detect the underground utility(s) thus significantly reducing the transmission bandwidth of the electromagnetic radiation data thus reducing transmission power, transmission time, latency, and/or the like. Adapting the electromagnetic sensor(s) to transmit reduced electromagnetic radiation data relating to a reduced frequency range may also the transmission bandwidth of the electromagnetic radiation data thus further reducing transmission power, transmission time, latency, and/or the like.

In addition, controlling the frequency of the electromagnetic signals transmitted by each of multiple transmitters deployed in the area may significantly improve identification of the underground utilities buried in the area and/or their direction, therefore better mapping the underground utilities in the area. This may be accomplished by adapting and/or controlling each transmitter to transmit electromagnetic signals having different frequencies and analyzing the electromagnetic radiation captured by the electromagnetic sensor to identify the frequency(s) of the radiation induced by the underground utilities. Coupled with location information of the respective transmitter(s) which transmit electromagnetic signals having the identified frequency(s), the underground utilities may be better detected and mapped.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer program code comprising computer readable program instructions embodied on a computer readable medium may be transmitted using any appropriate medium, including but not limited to wireless, wire line, optical fiber cable, RF, etc., or any suitable combination of the foregoing.

The computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

The computer readable program instructions for carrying out operations of the present invention may be written in any combination of one or more programming languages, such as, for example, assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of detecting underground utilities buried in the ground, according to some embodiments of the present invention.

An exemplary process 100 may be executed to detect one or more underground utilities and/or objects located in a certain area, for example, electric cables, telecommunication and data cables, water and sewer pipelines, gas and oil pipelines, and/or the like.

The process 100 may comprise three sub-process 110, 120 and 130 executed by distinct devices. The process 110 may be executed by one or more transmitters 204 for transmitting electromagnetic signals for exciting one or more underground utilities which in response may emit electromagnetic radiation which may be captured by one or more electromagnetic (EM) sensors 202 executing the process 120. Finally, a utilities detection system 200 may execute the process 130 for detecting one or more of the excited underground utilities based on the electromagnetic radiation captured by the electromagnetic sensor(s) 202.

Figure 2:
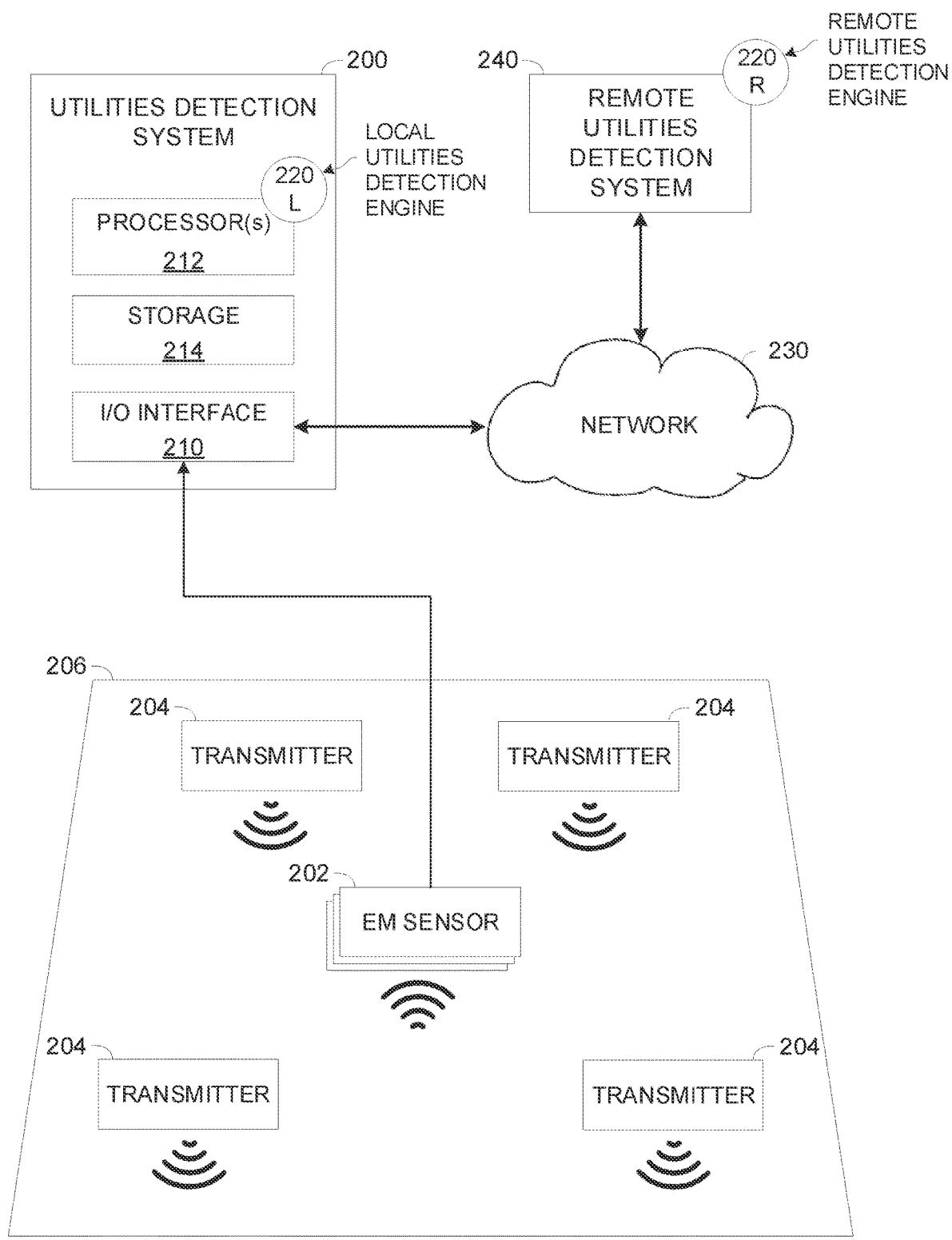
FIG. 2 is a schematic illustration of an exemplary system for detecting underground utilities buried in the ground, according to some embodiments of the present invention.

Reference is also made to FIG. 2, which is a schematic illustration of an exemplary system for detecting underground utilities buried in the ground, according to some embodiments of the present invention.

One or more transmitters 204 may be deployed to transmit electromagnetic signals into the ground in a certain area 206 in attempt to excite one or more underground utilities and induce an alternating current therein.

One or more of the transmitters 204 may be fixated, i.e., deployed at fixed location(s) to transmit electromagnetic signals into the ground from these fixed location(s). However, one or more of the transmitters 204 may be dynamically moveably to transmit electromagnetic signals from different locations, angles, elevation, and/or the like. For example, in order to effectively cover the certain area 206, a plurality of transmitters 204 may be deployed in fixed locations selected such that each transmitter 204 may have a respective coverage area which may overlap a sub-section of the area 206 and collectively the plurality of transmitters 204 may cover the entire area 206. In another example, one or more transmitters 204, optionally even a single transmitter 204 may be dynamically moveably across and/or over the area 206, for example, using one or more vehicles such as, for example, a ground vehicle, a drone, and/or the such that the dynamic transmitter(s) 204 may effectively cover the entire area 206.

The utilities detection system 200 may be deployed to detect, and optionally map one or more underground utilities and/or objects buried in a certain area 206, for example, electric cables, telecommunication and data cables, water and sewer pipelines, gas and oil pipelines, and/or the like, collectively designated underground utilities herein after.

Responsive to the electromagnetic signals transmitted by the transmitter(s) 204, the excited underground utility(s) may become energized with a magnetic field and emit electromagnetic radiation having a frequency corresponding to the frequency of the electromagnetic signals transmitted by the transmitter(s) 204.

One or more electromagnetic sensors 202 may be deployed to capture the electromagnetic radiation emitted by the excited underground utility(s) which are buried in the ground in the certain area 206.

One or more of the electromagnetic sensors 202 may be fixated in a fixed location for intercepting, receiving, and/or otherwise capturing the electromagnetic radiation received from the buried underground utility(s). However, typically one or more of the transmitters 204 may be dynamically moveably across and/or over the certain area 206, for example, via a vehicle (e.g., ground vehicle, drone, etc.) to capture the electromagnetic radiation emitted by the buried underground utility(s) in response to the electromagnetic signals transmitted by the transmitter(s) 204. For example, one or more electromagnetic sensors 202 may be deployed in fixed locations selected such that the electromagnetic sensor(s) 202 may effectively receive electromagnetic radiation emitted by excited underground utility(s) buried in any location in the certain area 206. In another example, one or more electromagnetic sensors 202, optionally a single electromagnetic sensor 202 may be dynamically moveably across and/or over the area 206 such that the dynamic electromagnetic sensor(s) 202 may effectively capture electromagnetic radiation emitted by excited underground utility(s) buried in any location in the certain area 206.

The utilities detection system 200 may receive the electromagnetic radiation captured by the electromagnetic sensor(s) 202 and based on its analysis may detect one or more underground utilities buried in the ground in the certain area 206 which are excited by the electromagnetic signals transmitted by the transmitter(s) 204. may be detected. Moreover, based on analysis of the electromagnetic radiation coupled with a geolocation of the electromagnetic sensor(s) 202 and/or the transmitter(s) 204, the utilities detection system 200 may map the detected underground utility(s), for example, compute its location, indicate its location in a Graphic User Interface (GUI) executed by one or more one or more client devices used by one or more users, and/or the like.

In particular, the transmitter(s) 204 may be adapted to transmit electromagnetic signals in a plurality of frequencies in one or more frequency bands and may execute the process 110 for adjusting the amplitude (voltage, power) and/or frequency of one or more of the transmitted electromagnetic signals in order to compensate for external impedance affecting the impedance of the transmitter(s) and maintain their transmission power in order to ensure that the electromagnetic signals may effectively penetrate the ground and be detected by the electromagnetic sensor(s) 202.

The electromagnetic sensor(s) 202 may be therefore comprise a wideband receiver designed, adapted and/or configured to receive, intercept and/or otherwise capture electromagnetic signals in the plurality of frequencies transmitted by the transmitter(s) 204 in the one or more frequency bands.

Figure 3:
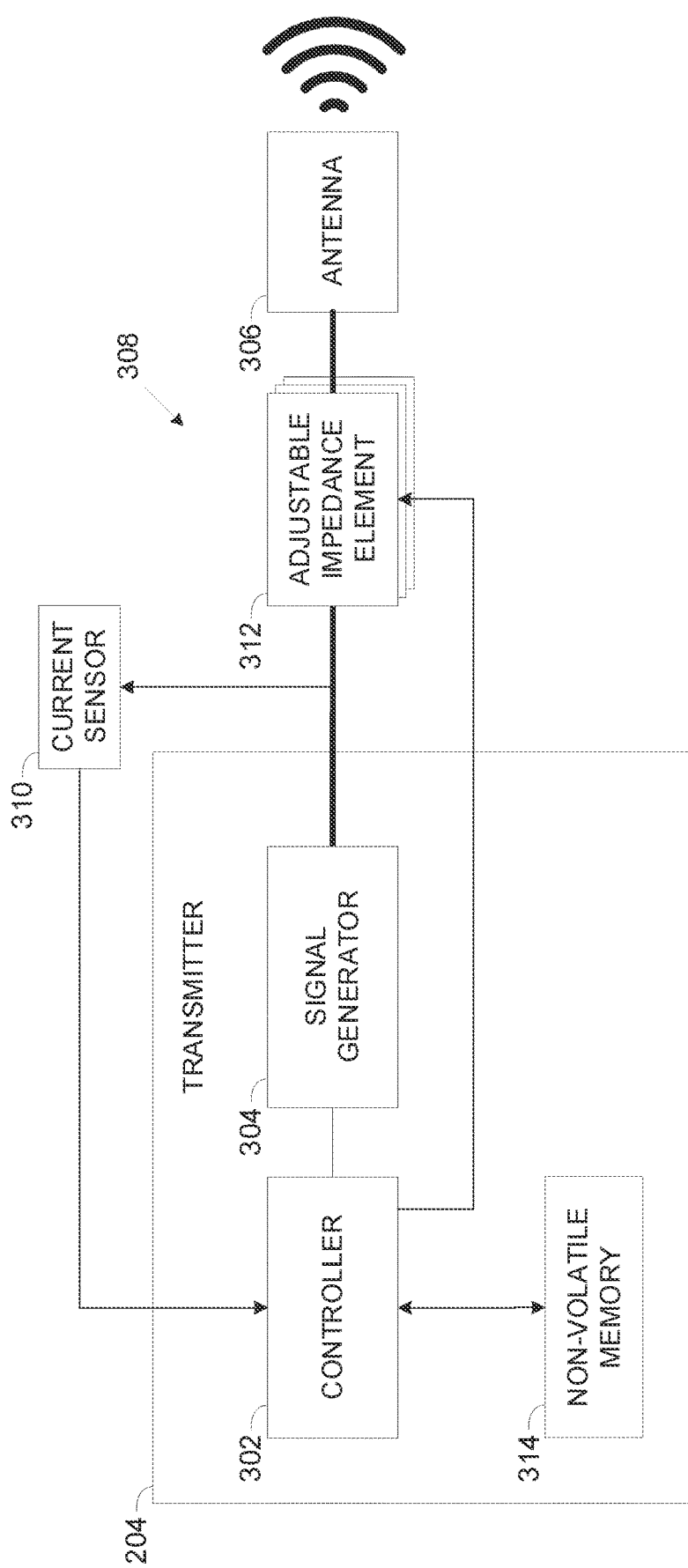
FIG. 3 is a schematic illustration of an exemplary multi-frequency electromagnetic signals transmitter used for detecting underground utilities buried in the ground, according to some embodiments of the present invention.

Reference is now made to FIG. 3, which is a schematic illustration of an exemplary multi-frequency electromagnetic signals transmitter used for detecting underground utilities buried in the ground, according to some embodiments of the present invention.

An exemplary transmitter such as the transmitter 204 may comprise a controller 302 for controlling a signal generator 304 to generate electromagnetic signals having a plurality of frequencies in one or more frequency bands which may be transmitted via an antenna 306 for detecting one or more underground utilities buried in the ground in a certain area such as the area 206.

The controller 302 may be implemented using one or more architectures, structures, and/or technologies. For example, the controller 302 may comprise one or more microprocessors, microcontrollers, logic circuits, and/or the like configured to execute one or more software modules, for example, a process, a script, an application, an agent, a utility, a tool, and/or the like each comprising a plurality of program instructions. The program instructions of the software module(s) may be stored in a non-volatile memory 314 of the transmitter 204, for example, ROM, Flash, and/or the like. Additionally and/or alternatively, the controller 302 may be utilized by one or more hardware elements, for example, a circuit, a component, an Integrated Circuit (IC), an Application Specific IC (ASIC), a Field Programmable Gate Array (FPGA), a Digital Signals Processor (DSP), and/or the like.

The controller may therefore execute one or more functional modules, which may be utilized by one or more software modules, one or more of the hardware modules and/or a combination thereof, for controlling the signal generator 304.

The transmitter 204 may be adapted to transmit into the ground electromagnetic signals having one or more of a plurality of frequencies in one or more frequency bands. Typically, the transmitter 204 may wirelessly transmit the electromagnetic signals into the ground. However, additionally and/or alternatively, the transmitter 204 may be adapted to transmit the electromagnetic signals into the ground via one or more wired means, for example, a wire, a spike, a pole, and/or the like inserted into the ground electrically coupled to the signal generator 304 via a feed circuit such as the antenna feed circuit 308, optionally instead of the antenna 306.

The terms antenna, antenna 306, antenna feed circuit, and antenna feed circuit 308 are therefore used herein after to reference embodiments comprising a wireless antenna 306 adapted for wireless transmission of electromagnetic signals into the ground, and embodiments comprising wired means (wired antenna) for directly driving electromagnetic signals into the ground. Moreover, while the antenna 306 and hence the antenna feed circuit 308 may be part of the transmitter 204, the antenna 306 and at least part of antenna feed circuit 308 may optionally be external to the transmitter 204 and electrically coupled to the transmitter 204.

In particular, the controller 302 may instruct, operate and/or otherwise control the signal generator 304 to adjust an amplitude and/or frequency of the electromagnetic signals to compensate for external impedance effects and maintain a transmission power of the electromagnetic signals above a certain transmission power threshold. Maintaining the transmission power above the threshold may ensure that the electromagnetic signals can effectively penetrate the ground and excite the underground utility(s) to emit electromagnetic radiation which may be accurately, robustly and/or reliably picked up and captured by one or more electromagnetic sensors such as the electromagnetic sensor 202.

The external impedance affecting the impedance of the transmitter 204 may be induced by one or more external devices and/or conditions, for example, a radiating device (e.g., another transmitter, power line, etc.), environmental condition (e.g., temperature, humidity, etc.), and/or the like.

The impact of external impedance may be reflected by changes in current driven through an antenna feed circuit 308 electrically coupling the signal generator 304 to the antenna 306. One or more current sense circuits, for example, a current sensor 310 may be therefore electrically coupled to the antenna feed circuit 308 to measure the current going through the antenna feed circuit 308. The current sensor 310 may be integrated in the transmitter 204 and/or external to the transmitter 204 and while not an integral part of the transmitter 204 is communicatively coupled to the controller 302.

The controller 302 may analyze the value of the current measured by the current sensor 310 and may operate the signal generator 304 to adjust the amplitude and/or frequency of one or more of the electromagnetic signals generated by the signal generator 304 to ensure that the current exceeds a certain threshold thus ensuring that the transmission power of the transmitted electromagnetic signals exceed the certain transmission power threshold.

The signal generator 304 may comprise one or more power circuits, for example, a power supply circuit, a power generator, a regulator, a transformer, an amplifier, and/or the like which may be controlled, optionally via one or more power management circuits, to adjust the amplitude and/or power of the electromagnetic signals generated by the signal generator 304 and driven to the antenna 306 via the antenna feed circuit 308.

The signal generator 304 may further include one or more clock generators, for example, an oscillator, a Phase-Locked Loop (PLL), a Digital PLL (DPLL), and/or the like which may be used to adjust the frequency of the electromagnetic signals driven through the antenna feed circuit 308 to the antenna 306 for transmission into the ground at the certain area 206.

Typically, the clock generator(s) may be used to adjust the frequency of the electromagnetic signals within one or more frequency bands, which may be relatively narrow. However, in order to efficiently excite underground utilities and/or to effectively compensate and adjust according to external impedance effects, it may be desired to generate electromagnetic signals in a wider frequency range (spectrum), for example, in a plurality of frequency bands.

In order to support selection of a plurality of frequency bands, the transmitter 204 may comprise one or more adjustable impedance elements 312 electrically coupled to the antenna feed circuit 308. One or more of the adjustable impedance element(s) 312 may be integrated in the transmitter 204. However, optionally, one or more of the adjustable impedance element(s) 312 may be external to the transmitter 204. Each such external adjustable impedance element 312 may be electrically coupled to the transmitter 240, specifically to the antenna feed circuit 308 and adjustable, for example, by the controller 302 and/or the signal generator 304 via one or more control and/or communication circuits.

The adjustable impedance element(s) 312 may be adjusted, for example, by the controller 302 and/or by the signal generator 304, to select and/or set a base (center) frequency of each of a plurality of frequency bands, for example, 10 kilohertz (kHz), 15 kHz, 20 kHz, 30 kHz, 50 kHz and/or the like. The base frequency of each frequency band may typically correspond to a resonance frequency of the antenna feed circuit 308 which may be constructed as an inductor-capacitor network (LC circuit) having a resonance frequency depending on the adjustable impedance element(s) 312 and optionally one or more other impedance inducing elements of the antenna feed circuit 308.

After selecting the base frequency, i.e., the resonance frequency of the antenna feed circuit 308, the controller 302 may operate the signal generator 304 to adjust the frequency of one or more electromagnetic signals, driven through the antenna feed circuit 308 to the antenna 306, to a frequency within the selected frequency band. For example, assuming the adjustable impedance element(s) 312 is adjust to set a base (center) frequency of 15 kHz, the controller 302 may operate the signal generator 304 to adjust the frequency of one or more electromagnetic signals in the frequency band around the 15 kHz base frequency, for example, in the range of 14.5 kHz to 15.5 kHz.

Optionally, the controller 302 may store, for example, in the non-volatile memory 314 data, for example, calibration data, reference data, and/or the like, which may be used for adjusting the frequencies and/or amplitudes of electromagnetic signals generated by the signal generator 304.

For example, the transmitter 204 may be calibrated post-production to record values of the current induced in the antenna feed circuit 308 during transmission of electromagnetic signals having one or more frequencies and/or amplitudes. Moreover, such calibration may be done in laboratory conditions with no external impedance effects to characterize the typical impedance of the antenna feed circuit 308 and derive, and/or compute accordingly one or more ratios, relations, and/or dependencies between the frequency and/or amplitude of the transmitted electromagnetic signals and the current induced in antenna feed circuit 308 during transmission of these electromagnetic signals.

The adjustable impedance element(s) 312, which may be adjusted, for example, by the controller 302 and/or by the signal generator 304, may comprise one or more adjustable impedance circuits, devices, and/or components employing one or more architectures, structures and/or technologies.

For example, the adjustable impedance element(s) 312 may comprise a plurality of fixed capacitance capacitors each electrically coupled to the antenna feed circuit 308 via a respective switch operable, for example, by the controller 302 and/or by the signal generator 304, to connect and disconnect the respective fixed capacitance capacitor. By connecting or disconnecting each of the fixed capacitors to the antenna feed circuit 308 via its respective switch, the capacitance and thus the impedance of the antenna feed circuit 308 may be adjusted.

In another example, the adjustable impedance element(s) 312 may comprise one or more variable capacitor each controllable to adjust its capacitance and hence adjust the impedance of the antenna feed circuit 308.

In another example, the adjustable impedance element(s) 312 may comprise a plurality of fixed inductance inductors each electrically coupled to the antenna feed circuit 308 via a respective switch operable, for example, by the controller 302 and/or by the signal generator 304, to connect and disconnect the respective fixed inductance inductor. By connecting or disconnecting each of the fixed inductors to the antenna feed circuit 308 via its respective switch, the inductance and thus the impedance of the antenna feed circuit 308 may be adjusted.

In another example, the adjustable impedance element(s) 312 may comprise one or more variable inductors each controllable to adjust its inductance and hence adjust the impedance of the antenna feed circuit 308.

Figure 4:
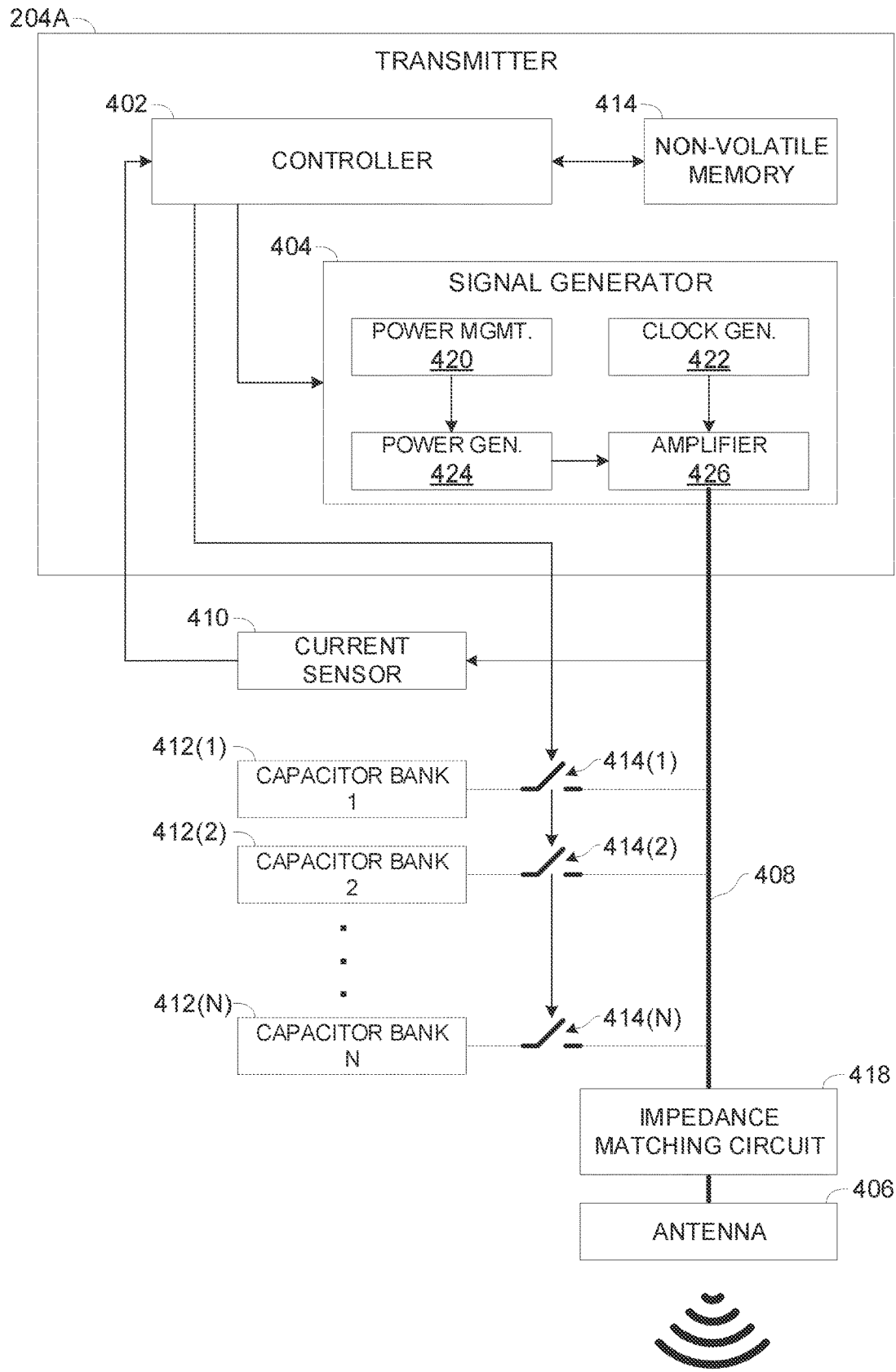
FIG. 4 is a schematic illustration of an exemplary embodiment of an adjustable impedance element of a multi-frequency electromagnetic signals transmitter used to set the frequency of transmitted electromagnetic signals for detecting underground utilities buried in the ground, according to some embodiments of the present invention.

FIG. 4 is a schematic illustration of an exemplary embodiment of an adjustable impedance element of a multi-frequency electromagnetic signals transmitter used to set the frequency of transmitted electromagnetic signals for detecting underground utilities buried in the ground, according to some embodiments of the present invention.

An exemplary transmitter 204A such as the transmitter 204 may comprise a controller 402 such as the controller 302, adapted to control a signal generator 404 such as the signal generator 304 to adjust the amplitude and/or frequency of one or more electromagnetic signals transmitted via an antenna 406 such as the antenna 306 for detecting one or more underground utilities buried in the ground in a certain area such as the area 206. As described herein before, the antenna 306 and the antenna feed circuit 308 may be part of the transmitter 204, or optionally, the antenna 306 and at least part of the antenna feed circuit 308 may be external to the transmitter 204.

The transmitter 204A may further include a non-volatile memory 414 such as the non-volatile memory 314 for storing ode (program store) executed by the controller 402 and/or data (data store), for example, calibration data, reference data, and/or the like.

As described herein before, the signal generator 404 may comprise one or more power generators 424 controllable via one or more power management circuits 420, to adjust the amplitude of the electromagnetic signals generated by the signal generator 404 and driven to the antenna 406 via an antenna feed circuit 408 such as the antenna feed circuit 308. The signal generator 304 may also include one or more clock generators 422 which may be used and/or operated to adjust the frequency of one or more electromagnetic signals driven through the antenna feed circuit 408 to the antenna 406 for transmission into the ground at the certain area 206.

The signal generator 404 may include one or more signal conditioning circuits, for example, an amplifier, an attenuator, a suppressor, a filter, and/or the like configured to adjust, condition, smooth, filter, de-noise, and/or the like the signals before driven via the antenna feed circuit 408 to the antenna 406. For example, the signal generator 404 may comprise an amplifier 426 adapted to use power received from the power generators 424 to power signals generated by the clock generator(s) 422 and set their amplitude accordingly.

One or more adjustable impedance elements such as the adjustable impedance elements 312 may be adjusted by the transmitter 204A, specifically by the controller 402 and/or the signal generator 404 to adjust, select and/or set the impedance of the antenna feed circuit 408 and select one or more of the plurality of frequency bands of the electromagnetic signals transmitted by the transmitter 204A.

In particular, the adjustable impedance element 312 may include a plurality of fixed capacitance capacitor banks 412, for example, a first capacitor bank 412(1) to an Nth capacitor bank 412(N) each comprising one or more capacitive elements, for example, a capacitor, and/or the like each having a fixed capacitance. As described herein before for the adjustable impedance element(s) 312, one or more of the capacitor banks 412 may be part of the transmitter 204A while optionally, one or more of the capacitor banks 412 may be external to the transmitter 204A.

Each of the capacitor banks 412 may be electrically coupled to the antenna feed circuit 408 via a respective switch 414 which is operable, for example, by the controller 402 and/or by the signal generator 404, to connect or disconnect the respective capacitor bank 412, i.e., to electrically couple or electrically decouple, the respective capacitor bank 412. For example, a switch 414(1) may be operable to connect or disconnect the first capacitor bank 412 (1). In another example, a switch 414(N) may be operable to connect or disconnect the Nth capacitor bank 412(N).

Coupling and/or decoupling one or more of the plurality capacitor banks 412 to the antenna feed circuit 408 which may further comprise one or more matching circuits 418 comprising one or more elements, for example, an inductor, a capacitor, a resistor, and/or the like, may affect the impedance of the antenna feed circuit 408. As such, the antenna feed circuit 408 may form an LC circuit having a resonance frequency defined by the combined value of capacitance of the capacitor banks 412 which are electrically coupled to the antenna feed circuit 408 and a value of one or more components of the matching circuits 418.

Therefore, coupling or decoupling each of the capacitor banks 412 to/from the antenna feed circuit 408 may set a plurality of resonance frequencies of the antenna feed circuit 408 where each resonance frequency defines the base frequency of a respective one of a plurality of frequency bands. For example, the capacitance of the capacitor banks 412 may be selected to set a base (center) frequency of a plurality of frequency bands, for example, 10 kHz, 15 kHz, 20 kHz, 30 kHz, 50 kHz and/or the like. These values may reflect the base frequency in laboratory conditions absent of external impedance effects. In the field, where external impedance may affect the impedance of the transmitter 204A, specifically the impedance of the antenna feed circuit 408, the base (resonance) frequency of one or more of the frequency bands may shift.

Reference is made once again to FIG. 2.

The utilities detection system 200, for example, a device, an apparatus, a server, a computing node, and/or the like deployed to detect underground utilities buried in the area 206, may comprise an Input/Output (I/O) interface 210, a processor(s) 212 and a storage 214.

The I/O interface 210 may include one or more wired and/or wireless communication interconnections, ports, and/or interfaces, for example, a Universal Serial Bus (USB) interface, a serial port, a Controller Area Network (CAN) bus interface, a Radio Frequency (RF), a Wireless Local Area Network (WLAN) interface, and/or the like.

Via the I/O interface 210, the utilities detection system 200 may connect and communicate with the electromagnetic sensor(s) 202 comprising one or more communication interconnections, ports, and/or interfaces. The utilities detection system 200 may thus receive from the electromagnetic sensor(s) 202 electromagnetic radiation data which may comprise the electromagnetic radiation emitted by the underground utilities buried in the certain area 206 and/or information thereof, i.e., information indicative of the electromagnetic radiation captured by the electromagnetic sensor(s) 202.

Via the I/O interface 210, the utilities detection system 200 may optionally connect and communicate with one or more of the transmitter(s) 204 which may optionally comprise one or more communication interconnections, ports, and/or interfaces.

Optionally, one or more of the electromagnetic sensor(s) 202 may directly communicate with one or more of the transmitter(s) 204 via their communication interconnections, ports, and/or interfaces.

The I/O interface 210 may further include one or more wired and/or wireless network interfaces for connecting to a network 230 comprising one or more wired and/or wireless networks, for example, a Local Area Network (LAN), a Wide Area Network (WAN), a Metropolitan Area Network (MAN), a cellular network, the internet and/or the like. Via the I/O interface 210, the utilities detection system 200 may therefore communicate with one or more remote network resources connected to the network 230, for example, a server, a storage server, a data center, a database, a cloud service, and/or the like. For example, via the network 230, the utilities detection system 200 may communicate with a remote utilities detection system 240.

The processor(s) 212, homogeneous or heterogeneous, may include one or more processing nodes and/or cores arranged for parallel processing, as clusters and/or as one or more multi core processor(s). The storage 214 may include one or more non-transitory persistent storage devices, for example, a ROM, a Flash array, a Solid State Drive (SSD), a hard drive (HDD) and/or the like. The storage 214 may also include one or more volatile memory devices, for example, a RAM component, a cache and/or the like.

The processor(s) 212 may execute one or more software modules such as, for example, a process, a script, an application, an agent, a utility, a tool, an Operating System (OS) and/or the like each comprising a plurality of program instructions stored in a non-transitory medium (program store) such as the storage 214 and executed by one or more processors such as the processor(s) 212.

The processor(s) 212 may further include, integrate and/or utilize one or more hardware modules available in the utilities detection system 200, for example, a circuit, a component, an IC, an ASIC, a FPGA, a DSP, a Graphic Processing Unit (GPU), a network processor, an Artificial Intelligence (AI) accelerator and/or the like.

The processor(s) 212 may therefore execute one or more functional modules, which may be utilized by one or more software modules, one or more of the hardware modules and/or a combination thereof. For example, the processor(s) 212 may execute a utilities detection engine for executing the process 130 to detect one or more underground utilities buried in the area 206.

Optionally, the utilities detection engine may be provided, executed and/or utilized at least partially by a remote utilities detection system 240, for example, a server, a computing node, a cluster of computing nodes and/or servers, and/or the like comprising one or more processors such as the processor(s) 212 adapted for executing the utilities detection engine.

Moreover, the utilities detection system 240, specifically the utilities detection engine may be provided, executed and/or utilized at least partially by one or more cloud computing services, for example, Infrastructure as a Service (IaaS), Platform as a Service (PaaS), Software as a Service (SaaS), and/or the like provided by one or more cloud services, cloud infrastructures, and/or the like such as, for example, Google Cloud, Microsoft Azure, Amazon Web Service (AWS) and Elastic Compute Cloud (EC2), IBM Cloud, and/or the like.

Evidently, the utilities detection system and hence the utilities detection engine may be deployed in one or more deployment modes, configurations, and/or architectures.

For example, a local deployment may be applied in which the utilities detection system 200 may be deployed locally on-site to execute a local utilities detection engine 220L for detecting one or more underground utilities buried in the area 206. In such case, the utilities detection system 200 which is communicational coupled to the electromagnetic sensor(s) 202 may receive the electromagnetic radiation data from the electromagnetic sensor(s) 202.

In another example, a remote deployment may be applied in which the remote utilities detection system 240 may be deployed remotely to execute a remote utilities detection engine 220R for detecting one or more underground utilities buried in the area 206. In such case, the remote utilities detection system 240 may be communicational coupled to the electromagnetic sensor(s) 202 via one or more communication channels, for example, the network 230 to receive the electromagnetic radiation data from the electromagnetic sensor(s) 202.

In another example, a distributed deployment may be applied in which the process 130 may be split and/or distributed between the local utilities detection engine 220L and the remote utilities detection engine 220R. For example, the local utilities detection engine 220L may collect the electromagnetic radiation captured by the electromagnetic sensor(s) 202 and transmit it to the remote utilities detection engine 220R which may analyze it to detect one or more underground utilities buried in the area 206.

Optionally, similar methods may be employed by the local utilities detection engine 220L and/or the remote utilities detection engine 220R to communicate with one or more of the transmitters 204 in order to exchange data with the transmitters 204.

Reference is made once again to FIG. 1.

For brevity, the local utilities detection engine 220L and the remote utilities detection engine 220R are collectively designated utilities detection engine 220 which is adapted to execute the process 130 regardless of the exact deployment configuration of the utilities detection system.

Moreover, the processes 110 is described for a single transmitter 204 deployed in the certain area 206. This, however, should not be construed as limiting since, as may be apparent to a person skilled in the art, the process 110 may be executed by multiple transmitters 204 deployed to transmit electromagnetic signals into the ground in the certain area 206. Similarly, the process 120 may be executed by multiple electromagnetic sensors 202 deployed to capture electromagnetic radiation emitted by one or more underground utilities excited by the electromagnetic signals transmitted from the transmitter(s) 204.

Also, for brevity, the transmitter 204 is described as executing the process 110 while in practice the process 110 may be executed by one or more components of the transmitter 204, for example, the controller 302, and/or the signal 304. Similarly, the electromagnetic sensor 202 is described to execute the process 120 while in fact, the process 120 may be executed by one or more logic circuits, controllers, processors, components, and/or elements of the electromagnetic sensor 202 which may be implemented through hardware, software, firmware, and/or a combination thereof.

Furthermore, the process 100 which is composed of the sub-processes 110, 120, and 130 is described for detecting one or more underground utilities in a single certain area 206. This, however, should not be construed as limiting since, as may be apparent to a person skilled in the art, the process 100 may be easily and intuitively expanded and scaled to detect underground utilities in a plurality of areas in which one or more transmitters such as the transmitter 204 are deployed to transmit electromagnetic signals into the ground and one or more electromagnetic sensors such as the electromagnetic sensor 202 are deployed to capture electromagnetic radiation emitted by one or more underground utilities buried in the respective area.

As shown at 112, the sub-process 110, which is an iterative process executed by the transmitter 204, starts with the transmitter 204 transmitting electromagnetic signals into the ground at the certain area 206.

As described herein before, the transmitter 204 may adjust the frequency of the transmitted electromagnetic signals to one or more of a plurality of frequencies in one or more frequency bands. The transmitter 204 may further adjust the amplitude of one or more of the transmitted electromagnetic signals.

The frequency and amplitude initially selected by the transmitter 204 for the transmitted electromagnetic signals may be based on one or more parameters, settings, configurations, attributes and/or the like which may relate to the transmitter 204, the electromagnetic sensor 202, the certain area 206, environmental conditions and/or the like.

For example, the transmitter 204 may be adapted to select the frequency, the frequency band, and/or the amplitude of one or more of the transmitted electromagnetic signals according to one or more parameters of the electromagnetic sensor 202, for example, a reception band, a distance of the electromagnetic sensor 202 from the ground, a distance of the electromagnetic sensor 202 from the transmitter 204, and/or the like.

In another example, the transmitter 204 may be adapted to select the frequency, the frequency band, and/or the amplitude of one or more of the transmitted electromagnetic signals according to one or more attributes of the certain area 206, for example, a soil type, an estimated depth of buried underground utility(s), and/or the like.

In another example, the transmitter 204 may be adapted to select the frequency, the frequency band, and/or the amplitude of one or more of the transmitted electromagnetic signals according to one or more environmental conditions identified in the certain area 206, for example, a temperature, a humidity, precipitation (e.g., rain, snow, etc.), and/or the like.

Optionally, the transmitter 204 may be adapted to select the initial frequency and/or amplitude according to one or more default settings defined in the transmitter 204 and stored, for example, in non-volatile memory such as the non-volatile memory 314. Moreover, the transmitter 204 may be further adapted to select the settings of the electromagnetic signals according to calibration data stored, for example, in the non-volatile memory 314.

However, as stated herein before, the transmission power of the electromagnetic signals transmitted from the transmitter 204 may be significantly reduced due to external impedance effects which may change the impedance of the transmitter 204. The reduced transmission power may lead to reduction and diminish of the electromagnetic radiation emitted by one or more underground utilities excited by the electromagnetic signals transmitted from the transmitter 204. Subsequently, reduction of the electromagnetic radiation emitted by the excited underground utility(s) may significantly reduce and/or degrade ability of the electromagnetic sensor 202 to effectively, efficiently, accurately and/or reliably capture this reduced electromagnetic radiation.

The frequency and/or amplitude initial selected for the electromagnetic signals transmitted by the transmitter 204 may be therefore insufficient and/or unsuitable for effective detection of the underground utility(s) buried in the certain area 206.

As shown at 114, in order to evaluate the transmission power of its transmitted electromagnetic signals, the transmitter 204 may measure the transmission power of the electromagnetic signals transmitted from the transmitter 204. In particular, the transmitter 204 may measure the current going through the antenna feed circuit 308 from which, as known in the art, the transmission power of the transmitted electromagnetic signals may be derived, and/or computed.

The current going through the antenna feed circuit 308 may be measured using one or more current sensors such as the current sensor 310 electrically coupled to the antenna feed circuit 308 for measuring the current flowing (going) through the antenna feed circuit 308.

As shown at 116, which is a conditional step, the transmitter 204 may compare the current measured in the antenna feed circuit 308 to a certain current threshold which may translate to comparing the transmission power of the electromagnetic signals transmitted by the transmitter 204 to a certain power threshold expressing transmission power which is sufficient for exciting underground utility(s) buried in the area 206 to emit sufficiently robust electromagnetic radiation which may be effectively captured by the electromagnetic sensor(s) 202.

In case (responsive to) the current measured in the antenna feed circuit 308 exceeds the certain current threshold, meaning that the transmission power of the electromagnetic signals transmitted by the transmitter 204 exceeds the certain power threshold, the process 110 may branch back to 112 and the transmitter 204 may transmit one or more additional electromagnetic signals having the previously set frequency and amplitude.

However, in case the measured current does not exceed (is below) the certain current threshold, indicating the transmission power of the transmitted electromagnetic signals does not exceed the certain power threshold, the process 110 may branch to 118.

Optionally, the current threshold may be predefined, adjusted, and/or dynamically set according to one or more operational parameters of the transmitter 204 (e.g., current drive, power consumption, etc.), one or more attributes of the certain area 206 (e.g., soil type, estimated depth of buried underground utility(s), etc.), one or more environmental conditions identified in the certain area 206 (e.g., temperature, humidity, precipitation, etc.), and/or the like.

As shown at 118, the transmitter 204 may adjust the amplitude and/or the frequency of one or more of the electromagnetic signal generated by the signal generator 304 of the transmitter 204 to induce a current exceeding the certain current threshold through the antenna feed circuit 308 in order to compensate for the external impedance affecting the transmitter 204.

The current going through the antenna feed circuit 308 depends on the amplitude (voltage) of the signal and the impedance of the antenna feed circuit 308 which is frequency dependent. Therefore adjusting the amplitude and/or the frequency of the signal generated by the signal generator 304 may affect the current through the antenna feed circuit 308 which in turn affects the transmission power of the electromagnetic signals transmitted via the e antenna 306.

For example, the transmitter 204 may select a different frequency band for the electromagnetic signals generated by the signal generator 304, for example, by adjusting one or more of the adjustable impedance element 312. In another example, the transmitter 204 may adjust the frequency generated by the signal generator 304 to select a different frequency within the currently set frequency band by controlling accordingly a clock generator such as the clock generator 422. In another example, the transmitter 204 may adjust the amplitude of the electromagnetic signals generated by the signal generator 304, for example, by controlling accordingly power generator such as the power generator 424.

The process 110 may then branch back to 112 where the transmitter 204 may transmit electromagnetic signals having the adjusted frequency and/or amplitude. The transmitter 204 may further execute one or more iterations of the iterative process 110 until the current in the antenna feed circuit 308 exceeds the current threshold.

Optionally, the transmitter 204 may provide an indication of the amplitude and/or frequency set by the transmitter 204 in order to inform one or more other entities, for example, the electromagnetic sensor 202, and/or the utilities detection engine 220 of the amplitude and/or frequency set for the electromagnetic signals transmitted by the transmitter 204. For example, as described herein before, the transmitter 204 may be capable of communicating with the utilities detection system 200 and/or the remote utilities detection system 240 and may transmit the indication of the amplitude and/or frequency set by the transmitter 204 to the utilities detection engine 220. In another example, the transmitter 204 may optionally be in communication with the electromagnetic sensor 202 and may thus transmit the indication of the amplitude and/or frequency set by the transmitter 204 to the electromagnetic sensor 202.

Optionally, the transmitter 204 may be adapted to maintain the transmission power of the electromagnetic signals below a peak power threshold. The transmitter 204 may adjust the amplitude of one or more of the transmitted electromagnetic signals to induce in the antenna feed circuit 308 a current which does not exceed a peak current threshold.

Limiting the transmission power below a certain maximum power defined by the peak power threshold may reduce power consumption of the transmitter 204 and/or prevent potential damage to the transmitter 204. Moreover, the limited power electromagnetic signals may reduce reflections of the signals from objects, surfaces and/or elements located in the area 206 which may degrade detection accuracy of underground utility(s) buried in the area 206. Furthermore, reducing the transmission power of the transmitted electromagnetic signals may prevent saturation of the electromagnetic sensor 202, in particular in case the electromagnetic sensor 202 is in close proximity to the transmitter 204.

Optionally, the transmitter 204 may be adapted to adjust the transmission power of its transmitted electromagnetic signals according to a distance between the electromagnetic sensor 202 and the transmitter 204. For example, assuming the distance between the electromagnetic sensor 202 and the transmitter 204 is small, the transmitter 204 may reduce the transmission power of its transmitted electromagnetic signals to prevent saturation of the close by electromagnetic sensor 202. In another example, assuming the distance between the electromagnetic sensor 202 and the transmitter 204 is large, the transmitter 204 may increase the transmission power of its transmitted electromagnetic signals to improve ability of the far away electromagnetic sensor 202 to effectively capture electromagnetic radiation emitted by the underground utility(s) excited by the increased power electromagnetic signals transmitted by the transmitter 204.

Optionally, assuming the transmitter 204 and the electromagnetic sensor 202 are in communication with each other, either directly and/or via the utilities detection engine 220, the transmitter 204 may be adapted to adjust the frequency and/or amplitude of one or more of its transmitted electromagnetic signals according to the electromagnetic radiation captured by the electromagnetic sensor 202.

For example, assuming that the electromagnetic sensor 202 captures very little electromagnetic radiation emitted by the underground utility(s) excited by the electromagnetic signals transmitted by the transmitter 204, the electromagnetic sensor 202 may report this to the transmitter and/or the utilities detection engine 220 which may rely this message to the transmitter 204. In response, the transmitter 204 may adjust the frequency and/or amplitude the electromagnetic signals to induce a higher current in the antenna feed circuit 308 and increase accordingly the transmission power of its transmitted electromagnetic signals and improve capturing of electromagnetic radiation by the electromagnetic sensor 202.

In another example, assuming that the electromagnetic sensor 202 captures very high electromagnetic radiation emitted by the underground utility(s) excited by the electromagnetic signals transmitted by the transmitter 204, the electromagnetic sensor 202 may report this to the transmitter and/or the utilities detection engine 220 which may relay this message to the transmitter 204. In response, the transmitter 204 may adjust the frequency and/or amplitude the electromagnetic signals to induce a lower current in the antenna feed circuit 308 and reduce accordingly the transmission power of its transmitted electromagnetic signals thus reducing power consumption of the transmitter 204 and/or reflections of electromagnetic signals which may degrade detection of the buried underground utility(s).

Optionally, the transmitter 204 may be adapted to set and/or select one or more of frequency bands for transmission of the electromagnetic signals according to one or more external commands received from one or more external systems, devices, and/or users, for example, the utilities detection engine 220, a user operating the system and/or the like. For example, an operator and/or user of the utilities detection engine 220 may determine that based on one or more attributes of the area 206, for example, soil type, temperature, and/or the like, a certain frequency band may be most effective for detecting buried underground utilities, for example, 18-22 kHz. In such case, the operator and/or user may instruct the transmitter 204, for example, via the detection engine 220, to select a base frequency of 20 kHz, for example, by adjusting accordingly one or more of the adjustable impedance element 312.

Optionally, the transmitter 204 may be adapted to disable transmission of the electromagnetic signals, typically in response to a stop transmission command received from one or more of the external systems, devices, and/or users. For example, assuming the electromagnetic sensor 202 is dynamically moveable over a large area 206 deployed with multiple static transmitters 204 each associated with a respective relatively small transmission area within the large area 206. In such case, electromagnetic signals transmitted by transmitters 204 which are located far away from the electromagnetic sensor 202 may be mostly and typically completely useless since they may not excite underground utilities which may be buried close by to electromagnetic sensor 202. One or more such far away transmitters 204 may be therefore instructed to disable their transmission in order to reduce their power consumption and conserve energy.

As seen in 122, the sub-process 120 executed by the electromagnetic sensor 202, starts with the electromagnetic sensor 202 intercepting, receiving, and/or otherwise capturing, the electromagnetic radiation emitted by one or more underground utilities buried in the ground in the certain area 206 in response to the electromagnetic signals transmitted by the transmitter 204 which excites the underground utility(s).

Since the transmitter 204 executes the process 100 to ensure that the transmission power of the electromagnetic signals exceeds the certain power threshold, the electromagnetic radiation emitted by the excited underground utility(s) may be sufficiently robust to be effectively and reliably captured by the electromagnetic sensor 202.

The frequency of the electromagnetic radiation emitted by the underground utility(s) corresponds to the frequency of the electromagnetic signals transmitted by the transmitter 204 which excite the underground utility(s). Since the frequency of the electromagnetic signals may be selected in a wide frequency range, specifically in the one or more frequency bands supported by the transmitter 204, the frequency of the electromagnetic radiation emitted by the underground utility(s) may also have a frequency in the one or more frequency bands.

In order to effectively capture the electromagnetic radiation emitted by the excited underground utility(s), the electromagnetic sensor 202 may comprise a wideband receiver adapted to capture electromagnetic radiation in a wide frequency range corresponding to the wide frequency range of the transmitter 204.

The electromagnetic sensor 202 may therefore scan through the frequencies in the one or more frequency bands in attempt to detect the electromagnetic radiation emitted by the excited underground utility(s).

As seen in 124, the electromagnetic sensor 202 may transmit the captured electromagnetic radiation data the utilities detection engine 220.

The electromagnetic radiation data transmitted to the utilities detection engine 220 may comprise the actual electromagnetic radiation and/or part thereof and/or information indicative of the captured electromagnetic radiation. The electromagnetic radiation data may be typically a reduced volume data comprising processed data, summary data, and/or the like which may be indicative of the electromagnetic radiation thus allowing the utilities detection engine 220 to reconstruct and/or derive the electromagnetic radiation captured by the electromagnetic sensor 202.

Optionally, the electromagnetic sensor 202 may be adapted and/or configured to capture electromagnetic radiation in a selected frequency range rather than in the entire wide frequency range. For example, rather than scanning the spectrum in multiple frequency bands, which may be supported by the transmitter 204, the electromagnetic sensor 202 may scan only a subset of frequency bands of the plurality of frequency bands or even a single frequency band in which the electromagnetic signals are transmitted by the transmitter 204. In another example, the electromagnetic sensor 202 may scan only part (portion) of one or more of the frequency bands supported by the transmitter 204, i.e., one or more segments of the frequency range of one or more of the frequency bands in which the electromagnetic signals are transmitted by the transmitter 204.

Scanning a reduced frequency range may reduce scan time, and/or power consumption of the electromagnetic sensor 202. Scanning the reduced frequency range may also yield reduced electromagnetic radiation data which may significantly reduce the bandwidth of transmission of the electromagnetic radiation data to the utilities detection engine 220.

Optionally, the electromagnetic sensor 202 may be adapted and/or configured to output only part of the captured electromagnetic radiation. In particular, the electromagnetic sensor 202 may output, for example, transmit to the utilities detection engine 220, only electromagnetic radiation data relating to electromagnetic radiation captured in a selected frequency range, for example, one or more of the plurality of frequency bands and/or part thereof. For example, assuming the transmitter 204 (in the process 110) transmits electromagnetic signals in a certain selected frequency range, the electromagnetic sensor 202 may transmit, to the utilities detection engine 220, electromagnetic radiation data relating to electromagnetic radiation captured only in the certain selected frequency range.

Transmitting electromagnetic radiation data relating to only part of the captured electromagnetic radiation, specifically to electromagnetic radiation captured only in the frequency range used by the transmitter 204 may further reduce the bandwidth of transmission of the electromagnetic radiation to the utilities detection engine 220.

The electromagnetic sensor 202 may apply one or more methods for selecting the frequency range for scanning and/or for selecting the electromagnetic radiation data transmitted to the utilities detection engine 220. For example, the electromagnetic sensor 202 may be adapted to identify increased signal level (e.g., Signal to Noise Ratio (SNR), transmission power, etc.) in one or more frequencies which may be indicative that these frequencies are used by the transmitter 204. In another example, the electromagnetic sensor 202 may receive from the transmitter 204 the indication of the frequency set by the transmitter 204 and may select this frequency for scanning and/or for transmission of the corresponding electromagnetic radiation data. In another example, the electromagnetic sensor 202 may be instructed by one or more users operating and/or using the utilities detection engine 220 to select the frequency(s) and/or frequency range(s) for scanning and/or for transmission, typically in conjunction with similar instructions to the transmitter 204 to select the same frequency(s) and/or frequency range(s).

As shown at 132, the process 130 executed by the utilities detection engine 220, starts with the utilities detection engine 220 receiving the electromagnetic radiation data indicative of the electromagnetic radiation captured by the electromagnetic sensor 202.

As described herein before, transmission of the electromagnetic radiation data from the electromagnetic sensor 202 to the utilities detection engine 220 may depend on the deployment of the utilities detection engine 220. For example, in the local deployment, the electromagnetic sensor 202 may transmit the electromagnetic radiation data to the local utilities detection engine 220L executed by the local on-site utilities detection system 200 via one or more local communication channels supported by the I/O interface 210 of the utilities detection system 200. In another example, in the remote deployment, the electromagnetic sensor 202 may transmit the electromagnetic radiation data to the remote utilities detection engine 220R executed by the remote utilities detection system 240 via the network 230 either directly and/or via the on-site utilities detection system 200 serving as intermediator to relay the data to the remote utilities detection engine 220R.

As shown at 134, the utilities detection engine 220 may analyze the electromagnetic radiation data to detect one or more of the underground utility(s) which were excited by the electromagnetic signals transmitted by the transmitter 204. The exact utilities detection methods, schemes, algorithms and/or techniques are known in the art and are out of scope of the present disclosure.

As shown at 136, which is an optional step, the utilities detection engine 220 may be further adapted to map one or more of the detected underground utilities.

In particular, the utilities detection engine 220 may compute a location of the detected underground utility according to the electromagnetic radiation captured by electromagnetic sensor 202 and a location of the electromagnetic sensor 202 and/or a location of the transmitter 204 at the time of capturing the respective electromagnetic radiation by the electromagnetic sensor 202.

One or more methods, schemes, algorithms and/or techniques as known in the art may be applied for computing the location of the detected underground utility based on the electromagnetic radiation and a location of the electromagnetic sensor 202 and/or the location of the transmitter 204, and are out of scope of the present disclosure.

The utilities detection engine 220 may obtain the location of the electromagnetic sensor 202 and/or the location of the transmitter 204 from one or more sources.

For example, the electromagnetic sensor 202 and/or the location of the transmitter 204 may each comprise one or more geolocation sensors attached to them, for example, a Global Navigation Satellite System (GNSS) sensor, a cellular triangulation sensor, an Inertial Measurement Unit (IMU), a wheel encoder (in case the sensor 202 is hosted by a wheeled ground vehicle), vision based navigation and/or the like which capture geolocation data indicative of the geolocation of the electromagnetic sensor 202 and/or the geolocation of the transmitter 204. The electromagnetic sensor 202 and/or the location of the transmitter 204 which may be in communication with the utilities detection engine 220, via the network 230 and/or via the I/O interface 210, may transmit their geolocation data to the utilities detection engine 220. The utilities detection engine 220 may therefore extract the geolocation of the electromagnetic sensor 202 and/or the transmitter 204 from the geolocation data received from them. This technique may enable the utilities detection engine 220 to determine the location of the electromagnetic sensor 202 and/or the location of the transmitter 204 whether they are dynamically moveable or whether they are fixated in a fixed location.

The utilities detection engine 220 may further map each detected underground utility based on its location in the certain area 206. For example, the utilities detection engine 220 may transmit the location of one or more detected underground utilities, for example, coordinates, depth, orientation, position, and/or the like to one or more client devices, for example, a computer, a tablet, a mobile device, a terminal and/or the like used by one or more users via the network 230. Transmission of the location of detected underground utilities may be done by the utilities detection engine 220 either directly to the client devices and/or via one or more cloud services.

In another example, the utilities detection engine 220 may update one or more maps, charts, pictures, and/or illustrations of the certain area 206 to indicate an estimated location of one or more of the detected underground utility(s). For example, assuming one or more of the client devices used by one or more of the users render and present a map of the area 206, the utilities detection engine 220 may communicate with one or more of these client devices via the network 230 and instruct them to adjust the GUI to indicate, and/or illustrate the detected underground utility(s) in the presented map.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant systems, methods and computer programs will be developed and the scope of the terms electromagnetic signals transmitter and electromagnetic sensor, are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, an instance or an illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for detecting underground utilities in a certain area, comprising:
    at least one transmitter deployed to transmit electromagnetic signals in at least one frequency band into the ground in a certain area, the at least one transmitter is adapted to maintain a transmission power of the electromagnetic signals above a certain power threshold by adjusting an amplitude and/or a frequency of each electromagnetic signal generated by a signal generator of the at least one transmitter to induce a current exceeding a certain current threshold through an antenna feed circuit electrically coupling the signal generator to an antenna of the transmitter to compensate for external impedance affecting the at least one transmitter;
    at least one electromagnetic sensor adapted to capture electromagnetic radiation emitted, in the at least one frequency band, by at least one underground utility in the certain area responsive to excitation by the electromagnetic signals transmitted by the at least one transmitter; and
    at least one processor, communicatively coupled to the at least one electromagnetic sensor, adapted to detect the at least one underground utility according to the electromagnetic radiation captured by the at least one electromagnetic sensor.

2. The system of claim 1, wherein the at least one processor is further adapted to compute a location of the at least one underground utility according to the electromagnetic radiation captured by the at least one electromagnetic sensor and at least one of: a location of the at least one electromagnetic sensor, and a location of the at least one transmitter.

3. The system of claim 2, wherein the location of the at least one electromagnetic sensor and/or the location of the at least one transmitter is extracted from geolocation data captured by at least one geolocation sensor mechanically coupled to the at least one electromagnetic sensor and to the at least one transmitter respectively.

4. The system of claim 2, wherein the location of the at least one electromagnetic sensor and/or the location of the at least one transmitter is predefined.

5. The system of claim 1, wherein the at least one electromagnetic sensor is dynamically moveable over the certain area.

6. The system of claim 1, wherein the at least one processor is locally deployed on-site at the certain area.

7. The system of claim 1, wherein the at least one processor is deployed remotely and is communicatively coupled to the at least one electromagnetic sensor.

8. The system of claim 1, wherein the at least one transmitter is further configured to transmit an indication of the amplitude and/or frequency of the electromagnetic signals transmitted by the respective transmitter.

9. The system of claim 1, wherein the at least one electromagnetic sensor is further configured to capture electromagnetic radiation in a selected frequency range.

10. The system of claim 1, wherein the at least one electromagnetic sensor is further configured to output information relating to electromagnetic radiation captured in a selected frequency range.

11. The system of claim 1, wherein the at least one transmitter is further adapted to adjust the transmission power of its transmitted electromagnetic signals according to a distance between the at least one electromagnetic sensor and the at least one transmitter.

12. The system of claim 1, wherein the at least one transmitter is further configured to adjust the frequency and/or amplitude of at least one electromagnetic signal transmitted by the respective transmitter according to the electromagnetic radiation captured by the at least one electromagnetic sensor.

13. The system of claim 1, wherein the at least one transmitter is further adapted to disable transmission of the electromagnetic signals.

14. The system of claim 1, wherein the at least one transmitter is further adapted to set the at least one frequency band according to an external command.

15. The system of claim 1, wherein the at least one transmitter is further adapted to maintain the transmission power of the electromagnetic signals below a peak power threshold by adjusting the amplitude of at least one electromagnetic signal to induce a current not exceeding a peak current threshold through the antenna feed circuit.

16. The system of claim 1, wherein the at least one transmitter is configured to set a base frequency of the at least one frequency band by adjusting at least one adjustable impedance element electrically coupled to the antenna feed circuit.

17. The system of claim 16, wherein the at least one adjustable impedance element comprises a plurality of fixed capacitance capacitors each electrically coupled to the antenna feed circuit via a respective switch operable to connect and disconnect the respective fixed capacitance capacitor.

18. The system of claim 16, wherein the at least one adjustable impedance element comprises at least one variable capacitor.

19. The system of claim 1, wherein the signal generator is adapted to adjust the frequency of the transmitted electromagnetic signals within the at least one frequency band using a clock generator.

20. A method of detecting underground utilities in a certain area, comprising:
  using at least one processor for:
    receiving data indicative of electromagnetic radiation captured in at least one frequency band by at least one electromagnetic sensor deployed to capture electromagnetic radiation emitted by at least one underground utility located in a certain area, the at least one underground utility emits the electromagnetic radiation responsive to excitation by at least one electromagnetic signal transmitted in at least one frequency band by at least one transmitter deployed to transmit electromagnetic signals into the ground in the certain area; and
    detecting the at least one underground utility according to the electromagnetic radiation captured by the at least one electromagnetic sensor;
  wherein the at least one transmitter is adapted to maintain a transmission power of the electromagnetic signals to exceed a certain power threshold by adjusting an amplitude and/or a frequency of each electromagnetic signal generated by a signal generator of the at least one transmitter in at least one frequency band to induce a current exceeding a certain current threshold through an antenna feed circuit electrically coupling the signal generator to an antenna of the transmitter to compensate for external impedance affecting the at least one transmitter.

* * * * *